UNITED STATES PATENT OFFICE 2,455,869

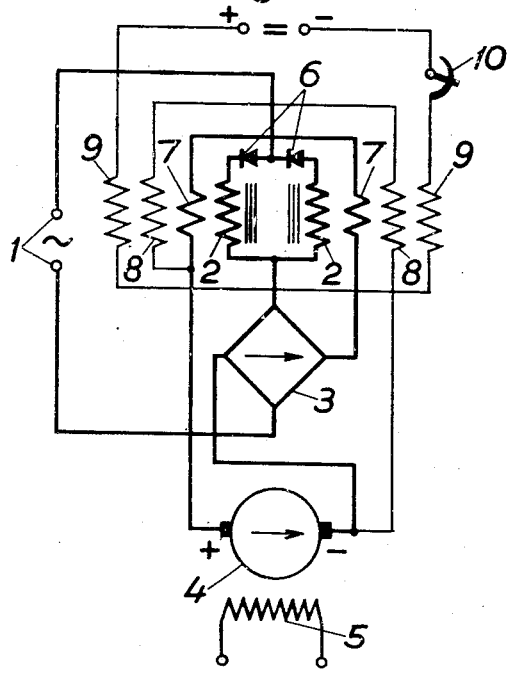
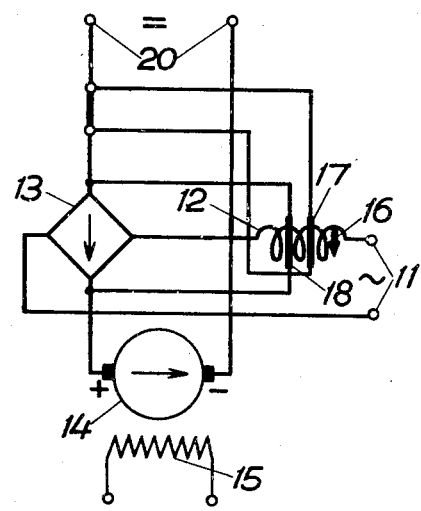
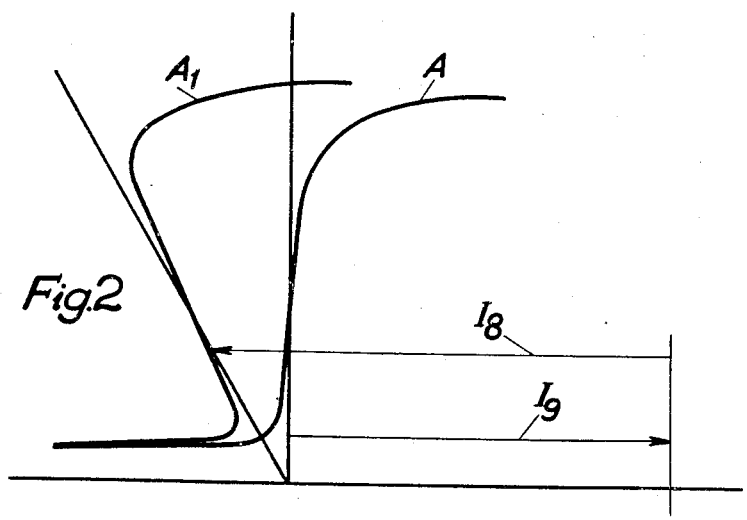

MEANS FOR OPERATING SEPARATELY EXCITED DIRECT-CURRENT MOTORS

Ulrik Krabbe, Fruens Boge, Denmark, assignor to Allmanna Svenska Elektriska Aktiebolaget, Vasteras, Sweden, a corporation of Sweden Application December 4, 1947, Serial No. 789,732
In Sweden December 6, 1946

3 Claims. (Cl. 318—308)

In operating separately excited direct current motors, it is often important to compensate more or less the ohmic voltage drop in the motor armature. This is for instance the case especially when the motor shall be permanently or temporarily operated at a low speed, for instance in Ward-Leonard drives for elevators, paper making machinery or printing presses, or for an exact regulation of the brush rockers in three-phase commutator motors for the purpose of speed regulation. Especially in such cases, it has been found difficult to control exactly the speed of the direct current motor for the reason that the ohmic voltage drop in the armature varying with the current and therefore also with the load torque often constitutes the major part of the impressed voltage. It has therefore often been necessary to employ a separate speed regulator for the motor, which means an essential complication.

The present invention solves the problem of obtaining a speed essentially independent of the load torque in separately excited direct current motors, especially in such motors running at low speed, in a simple manner by connecting the armature of the motor across a rectifier controlled by a certain type of direct current presaturable reactor, hereinafter for the purpose of shortness referred to as a "transductor." The said transductor has a self-magnetisation so dimensioned that its ampereturns are substantially equal to the ampereturns of the alternating current, hereinafter referred to as a "hundred per cent self-magnestisation." In addition to this, the transductor has a positively acting magnetizing component essentially proportional to the motor current and an opposing compoent essentially proportional to the direct current voltage of the rectifier. In some cases, especially if the rectifier forms the only voltage source of the motor, the transductor has also a positively acting essentially constant magnetizing component, which then essentially determines the speed of the motor. It has been found that the motor speed in this manner can be kept essentially constant, independently of the load torque. The speed can be adjusted by adjusting the constant positive magnetizing component.

In the accompanying drawing, Fig. 1 shows a diagram of connections for a form of the invention and Fig. 2 a diagram of the manner of operation of this form. Fig. 3 shows a diagram of connections for another form of the invention.

Referring to Fig. 1, 1 designates a source of alternating current, to which a direct current saturable reactor (a "transductor") 2 and a rectifier 3 are connected in series. The direct current terminals of the rectifier are connected to the brushes of a direct current motor 4 having a separate excitation. The transductor has two parallel alternating current windings 2 and in series with each of these windings a unidirectional valve element 6 so directed, in a manner well-known per se, that each winding 2 is only traversed by a half-wave of the alternating current, said half-waves combining to a pulsating direct current traversing the windings 2 in series. It is well known that such a connection operates as a high self-magnetisation of the transductor by direct current and gives the characteristic thereof referred to hereinafter. Each of the windings 2 has a separate core, and this core also supports three additional windings 7, 8, 9. The windings 7 are traversed by the load current and magnetize in the same sense as the self-magnetisation (hereinafter referred to as positive sense). The windings 8 magnetize in the opposite (negative) sense and are fed from the terminal voltage of the motor, while the windings 9 magnetize in the positive sense and are fed by a current capable of regulation at will, for instance by means of a resistor 10.

The manner of operation of the connection now described is illustrated in Fig. 2. The curve A in this figure represents the usual characteristic of a 100 per cent self-magnetized transductor, i. e. the traversing alternating current as a function of the controlling direct current ampereturns. If this transductor obtains an additional magnetisation proportional to the traversing current by means of the winding 7, i. e. totally a more than 100 per cent self-magnetisation, the curve A is replaced by the curve A₁, which has the property that most of the points thereof represent in stable operation points. By adding two more mutually oppositely directed magnetisations represented by the windings 8 and 9 and designated in Fig. 2 by $I_8$ and $I_9$, the transductor is, however, caused to operate in a stable manner so that the rectifier will furnish at each instant to the motor a voltage, which is composed by one constant component and one component proportional to the current. Should for instance the voltage show an instantaneous tendency to drop below the said value, the positively acting windings 7 and 9 will predominate over the negatively acting winding 8, which causes a raising of the voltage furnished by the rectifier until equilibrium has been restored. The conditions will be analogous at a raising of the voltage, which is then also restored to the desired value.

The connection according to Fig. 3 is especially intended for such cases, when a direct current motor shall be operated at a speed adjustable between wide limits but substantially independent of the load for each adjusted value. The armature of the motor is designated by 14 and its exciting winding by 15, while 20 designates a pair of direct current terminals, between which the voltage can be regulated between wide limits for regulating the speed of the motor. In series with the motor there is connected a rectifier 13, the alternating current inputs of which are connected to a pair of alternating current terminals 11 across a transductor 12. The latter is preferably of the same general character as the transductor 2 of Fig. 1, except that it has only two externally fed magnetizing windings instead of three, but for the purpose of simplicity it has been only conventionally illustrated, the self-magnetisation by means of internal valves being represented by the heavy line with an arrow 16 and the two externally fed windings by two other heavy lines 17 and 18 crossing the symbol 12 representing the alternating current winding. This has been found to be a handy and convenient form of illustrating a transductor having a plurality of direct current magnetizing components. The winding 17 which acts in the positive sense is connected in a shunt to the main direct current circuit, while the winding 18 acting in the negative sense is connected between the direct current terminals of the rectifier 13.

The manner of operation of the connection according to Fig. 3 is essentially the following one. The rectifier 13 connected in the main circuit furnishes no voltage as long as the current supplied from the alternating current side is lower than the load current of the motor but may furnish any voltage within the limits of the voltage of the alternating current terminals 11 and of the dimensioning of the transductor as soon as the current from the alternating current side tends to exceed the main current, which is normally the case.

If the voltage across the rectifier 13 tends to decrease below the value proportional to the traversing current with a certain factor, the ampereturn number of the winding 18 falls below that of the winding 17 and the transductor then loses its equilibrium and raises its magnetisation so as to raise the voltage again. In an analogous manner, the voltage is prevented from rising above a value proportional to the current. The factor of proportionality is determined by the ratio between the number of turns of the windings 17 and 18 and of the ratio between the shunt current traversing 17 and the main current. The said factor may also be so chosen that the additional voltage supplied by the rectifier 13 corresponds to the ohmic voltage drop in the motor 14 or to such a voltage proportional thereto, which is regarded as advisable with respect to the operation, whence the speed of this motor may be totally or partly independent of the load. In some cases it may for instance be advisable that the speed of the motor decreases somewhat at a rising load although not so much as corresponds to its internal voltage drop, and in other cases it may be desirable that the speed is somewhat raised with the load. Both these results can be obtained by a suitable mutual proportioning by the number of the turns of the windings 17 and 18.

I claim as my invention:

1. Means for operating direct current motors comprising a direct current motor with separate excitation, a rectifier having direct current terminals connected in series with said motor and alternating current terminals connected in series with a direct current saturable reactor to alternating current terminals, self-magnetizing means for said reactor, and at least two additional magnetizing means for said reactor, one of which cooperates with the self-magnetizing means and is essentially proportional to the armature current of the motor, while another opposes the self-magnetisation and is essentially proportional to the voltage across the rectifier.

2. Means for operating direct current motors, comprising a direct current motor with separate excitation, a rectifier having direct current terminals connected to the armature terminals of said motor and alternating current terminals connected in series with a direct current saturable reactor to alternating current terminals, self-magnetizing means for said reactor, and additional magnetizing means for said reactor, one of which cooperates with the self-magnetizing means and is essentially proportional to the armature current of the motor, one of which, also cooperating with said self-magnetizing means, is independent of the current and voltage of the motor, and one of which additional magnetizing means, which opposes the other ones, is substantially proportional to the voltage across the rectifier.

3. Means for operating direct current motors, comprising a direct current motor with separate excitation, a rectifier having direct current terminals, connected in series with said motor and with an independent voltage source, and alternating current terminals connected in series with a direct current saturable reactor to alternating current terminals, self-magnetizing means for said reactor, and at least two additional magnetizing means for said reactor, one of said additional magnetizing means cooperating with the self-magnetizing means and being essentially proportional to the armature current of the motor and another opposing the self-magnetisation and being essentialy proportional to the voltage across the rectifier.

ULRIK KRABBE.

No references cited.